(12) United States Patent
Schneider et al.

(10) Patent No.: US 9,891,994 B1
(45) Date of Patent: Feb. 13, 2018

(54) UPDATED RAID 6 IMPLEMENTATION

(71) Applicant: EMC Corporation, Hopkinton, MA (US)

(72) Inventors: Zvi Schneider, Raanana (IL); Tal Ben-Moshe, Kiryat Ono (IL); Niko Farhi, Petach-Tikva (IL); Lior Kamran, Reshon Letzion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/984,137

(22) Filed: Dec. 30, 2015

(51) Int. Cl.
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0689* (2013.01)

(58) Field of Classification Search
CPC .. G06F 3/0619; G06F 3/0689; G06F 11/1076; G06F 11/1088; G06F 3/064
See application file for complete search history.

(56) References Cited

U.S. PATENT DOCUMENTS

| | | | | |
|---|---|---|---|---|
| 6,675,318 B1 * | 1/2004 | Lee | ..................... | G06F 11/1076 714/6.21 |
| 6,993,701 B2 * | 1/2006 | Corbett | ............... | G06F 11/1076 711/114 |
| 7,406,621 B2 * | 7/2008 | Lubbers | ............... | G06F 11/1088 711/114 |
| 7,594,075 B2 * | 9/2009 | Roberson | ............ | G06F 11/1076 711/114 |
| 8,595,606 B1 * | 11/2013 | Feng | .................. | H03M 13/2909 714/800 |
| 2006/0129873 A1 * | 6/2006 | Hafner | ................ | G06F 11/1076 714/5.1 |

OTHER PUBLICATIONS

Rahman et al., Soft error tolerance using horizontal-vertical double-bit diagonal parity method., May, 2015, 2nd Int'l conf. on Elect. Engineering and Info. & comm. Tech. (ICEEICT), pp. 1-6.*
Xiang et al., A hybrid approach of failed disk recovery using RID-6 codes: algorithms and performance evaluation, Nov. 2011, ACM Trans. on Storage, pp. 1 to 34.*
Paris et al., Protecting RAID arrays against unexpectedly high disk failure rates, 2014, IEEE, pp. 68-75.*

* cited by examiner

*Primary Examiner* — Shelly A Chase
(74) *Attorney, Agent, or Firm* — Konrad R. Lee; Krishnendu Gupta (57) ABSTRACT

A system, computer program product, and computer-executable method of implementing a redundant array of independent disk (RAID) system wherein the RAID, the computer-executable method comprises storing data storage blocks arranged in a first plurality of data rows and a second plurality of data columns and storing parity data in defined parity blocks, wherein a portion of the defined parity blocks include column parity data.

15 Claims, 9 Drawing Sheets

FIG. 1

| D0 | D1 | D2 | D3 | D4 | P | Q |
|---|---|---|---|---|---|---|
| Data | Data | Data | Data | Data | Row Parity | Diagonal Parity |
| Data | Data | Data | Data | Data | Row Parity | Diagonal Parity |
| Data | Data | Data | Data | Data | Row Parity | Diagonal Parity |
| Data | Data | Data | Data | Data | Row Parity | Diagonal Parity |
| | | | | | | Diagonal Parity |

FIG. 2

| Data Disk 1 | Data Disk 2 | Data Disk 3 | Data Disk 4 | Data Disk 5 | Row Parity Disk | Diagonal Parity Disk |
|---|---|---|---|---|---|---|
| <1, 5> | <1, 6> | <1, 7> | <1, 8> | <1, 9> | ⊕1 | ⊕5 |
| <2, 6> | <2, 7> | <2, 8> | <2, 9> | <2, 5> | ⊕2 | ⊕6 |
| <3, 7> | <3, 8> | <3, 9> | <3, 5> | <3, 6> | ⊕3 | ⊕7 |
| <4, 8> | <4, 9> | <4, 5> | <4, 6> | <4, 7> | ⊕4 | ⊕8 |
| | | | | | | ⊕9 |

| D1 | D2 | D3 | D4 | D5 | P | Q |
|---|---|---|---|---|---|---|
| Data | Data | Data | Data | Data | Row Parity | Diagonal Parity and Column Parity |
| Data | Data | Data | Data | Data | Row Parity | Diagonal Parity and Column Parity |
| Data | Data | Data | Data | Data | Row Parity | Diagonal Parity and Column Parity |
| Data | Data | Data | Data | Data | Row Parity | Diagonal Parity and Column Parity |

FIG. 5A

| D1 | D2 | D3 | D4 | D5 | Row Parity | Diagonal and Column Parity |
|---|---|---|---|---|---|---|
| <1,5> | <1,6,9> | <1,7,10> | <1,8,11> | <1,12> | 1 | 5  9 |
| <2,6> | <2,7,9> | <2,8,10> | <2,11> | <2,5,12> | 2 | 6  10 |
| <3,7> | <3,8,9> | <3,10> | <3,5,11> | <3,6,12> | 3 | 7  11 |
| <4,8> | <4,9> | <4,5,10> | <4,6,11> | <4,7,12> | 4 | 8  12 |

UPDATED RAID 6 IMPLEMENTATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method of implementing a redundant array of independent disk (RAID) system wherein the RAID, the computer-executable method comprises storing data storage blocks arranged in a first plurality of data rows and a second plurality of data columns and storing parity data in defined parity blocks, wherein a portion of the defined parity blocks include column parity data.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Traditionally, standard RAID 6 scheme implementations are complicated. Generally, recovering one or more failed disks causes a high amount of read latency. Typically, much of the read latency is caused by the extra Q, which adds complexity to a RAID implementation as the extra Q breaks the column's layout of stripes on a disk and requires special handling in case of a Q disk rebuild. Traditionally, known methods to avoid keeping extra Q introduces disadvantages upon a recovery upon data disk and row-parity disk failure, where each read requires reading a large part of the data stripe before recovering a single data block. Conventionally, improvements to the RAID 6 Scheme would be beneficial to the data storage industry.

In many embodiments, the current disclosure may enable implementation of a simplified RAID 6 scheme. In various embodiments, the current disclosure may enable implementation of a RAID 6 scheme that may reduce read latency in the case of a single or a double disk failure. In certain embodiments, the current disclosure may enable recovery without requiring reading a large part of a data stripe within a RAID 6 scheme before recovering a single data block of a failed disk.

Redundant Array of Independent Disks (RAID) System

Figure 1:
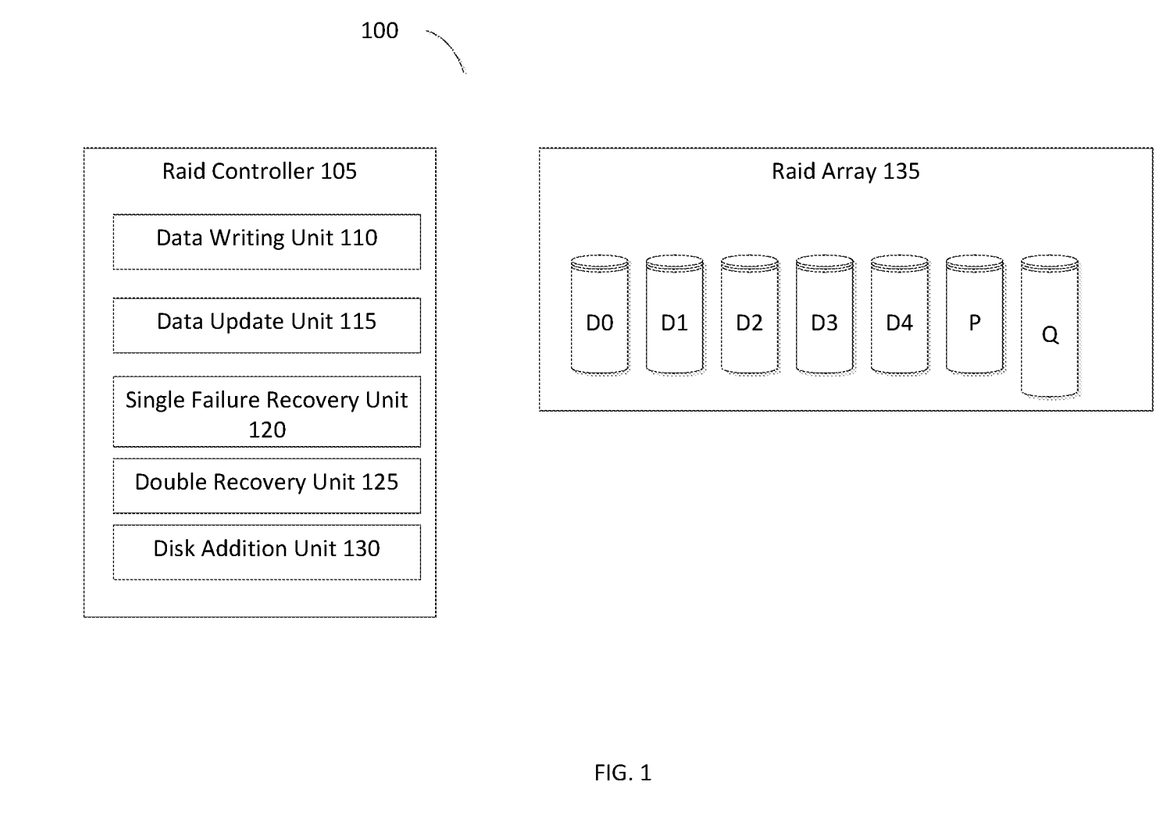
FIG. 1 is a simplified illustration of a redundant array of independent disk (RAID) system, in accordance with an embodiment of the present disclosure.

Refer to the example embodiment of FIG. 1. FIG. 1 is a simplified illustration of a redundant array of independent disk (RAID) system, in accordance with an embodiment of the present disclosure. RAID system 100 includes a controller 105 and an array 135 of data storage disks, in this example five data disks (D0-D4).

The controller 105 includes a data write unit 110 for writing initial data into the array, an update unit 115 for updating existing data in the array, a single failure recovery unit 120 for recovering data after a single disk failure, and a double failure recovery unit 125 for recovering data following concurrent failure of two disks. A disk addition unit 130 manages the addition of new disks to the system, either after failure of an existing disk or when it is desired to expand the system 100. The operation of each of these units is discussed in greater detail herein below.

Each of the disks in the array 135 stores a column of data blocks. The same data block in successive disks forms a row, which is to say the rows cross the disks. The data storage blocks are stored alongside parity data blocks in parity disks P and Q, and the number of data blocks in the different columns or disks are different. Row parity data is placed in row parity blocks in row parity column P. Diagonal parity data is placed in diagonal parity blocks in a diagonal parity column Q.

In the case of five data columns and four data rows, the numbers of diagonals is one greater than the number of rows. Hence the diagonal parity column Q comprises one more block than the other columns. More generally, as will be discussed below, the max number of data columns is a prime number, and the number of rows is one less than that prime number, creating the asymmetry discussed hereinabove. In practice the various columns are distributed over the physical disks available, so as not to cause system bottlenecks.

In many embodiments, an array may comprise a plurality of solid state drives (SSD) as opposed to magnetic disks. In various embodiments, SSDs may be random access, whereas magnetic disks may be mechanical devices with momentum. In certain embodiments, the magnetic disks may be most efficient where data readout may be largely serial and having uneven sizes of columns between stripes causes the magnetic disks to work inefficiently. In some embodiments, SSDs however may be solid state with no momentum issues and thus the present embodiments may be ideally suited to an array of SSD devices, or any other random access device.

In many embodiments, the number of data columns may equal a prime number and the number of data rows is one less than the number of data columns, to create an asymmetry that ensures that each column is absent from one of the diagonals.

In an embodiment, the number of data columns may be equal to a number of disks allowed in the array, which is the prime number referred to above. At any given time an actual number of disks present is less than or equal to the allowed number of disks, so that new disks can be added until that allowed number is reached. When a disk is added, data parity blocks need to be added to the new disk to keep the parity blocks, the p and q columns, evenly spread over the physical disks to avoid system bottlenecks. Hence the controller 105 comprises a disk addition unit 130 to manage the process of adding a disk to the array. In order to add a new disk to the array and maintain a balance of parity blocks over the array, the disk addition unit 130 migrates a row parity block to the new disk. However, in an embodiment, instead of actually writing data on the new disk, the unit in fact retains the row parity blocks at their original disk position and defines a zeroed block of data in the new disk to receive future parity updates for the selected row parity block. Because the original parity block is retained, zero is the current correct parity for the row, so that only updates from now onwards are needed and a resource consuming read and write is avoided. The disk addition unit copies a single diagonal parity block to the new disk since the addition of a new disk means there is a single old diagonal parity block that does not reside in the new diagonal parity group. The rest of the diagonal parity blocks are defined as zeroed blocks of data in an identical manner to the case described above for row parity blocks, because they can be placed in positions such that they are in the same parity group as the old diagonal parity blocks.

The controller 105 comprises a single-disk failure recovery unit 120. A basic embodiment recovers the data of the entire disk using row parity only or diagonal parity only. However a more efficient embodiment uses row parity to recover just some, typically half, or the lost data blocks and then switches to diagonal parity to recover the remaining data blocks. The switch to diagonal parity means that data blocks already read to recover row parity data can be reused and thus the entire disk can be recovered with considerably fewer read operations.

A double-disk failure recovery unit 125 is used to recover data following failure of two of the disks. The unit selects a first block for recovery from one of the disks, where the block's diagonal parity includes that block but does not include any blocks from the other missing column. The unit recovers this first block using the diagonal parity. The unit then recovers the block of the same row in the second missing disk using the row parity. The unit continues to alternate between diagonal and row parity until all the rows are recovered.

The data update unit 115 writes a new data block over an old data block. The data update unit reads the old data block, and existing parity data, then writes the new data block and XORs data of the old data block with data of the new data block and the existing parity data to form new parity data. There is no need to read the other data blocks in the same row or column since they remain unchanged, meaning their parity remains unchanged.

Now consider in greater detail, the present embodiments reduce system overheads at the expense of capacity. A block is added to contain the parity of the kth diagonal. This leads to the disadvantage of having columns which are different sizes, and thus disks which are different sizes. In fact the different sized disk problems can be avoided if the blocks are spread over disks in such a way as to provide no noticeable difference. Spreading over different disks has the added advantage of prevent bottleneck creation, as discussed with the existing schemes.

A Raid 6 scheme based on magnetic disks requires sequential disk actions and the absence of an even disk layout means that the tendency of disk actions to be sequential is lost. However when working with SSDs which are much more random access, data access can be in any desired sequence without any issue of mechanical inertia.

An SSD is a data storage device that uses solid-state memory to store persistent data with the intention of providing access in the same manner of a traditional block I/O hard disk drive. SSDs are distinguished from traditional hard drives (HDDs), which are electromechanical devices containing spinning disks and movable read/write heads. In contrast, SSDs use microchips which retain data in non-volatile memory chips and contain no moving parts. Compared to electromechanical HDDs, SSDs are typically less susceptible to physical shock, are silent, have lower access time and latency, but are many times more expensive per gigabyte (GB). SSDs use the same interface as hard disk drives, thus easily replacing them in most applications.

At present, SSDs use NAND-based flash memory, which retains memory even without power. SSDs using volatile random-access memory (RAM) also exist for situations which require even faster access, but do not necessarily need data persistence after power loss, or use external power or batteries to maintain the data after power is removed.

The scheme present being outlined also requires more space for redundancy than other RAID6 schemes. For example, in an embodiment, let K represent a number of total number of data disks within a RAID6 Scheme. As K gets larger, the additional overhead gets smaller so that this particular disadvantage is manageable.

Figure 2:
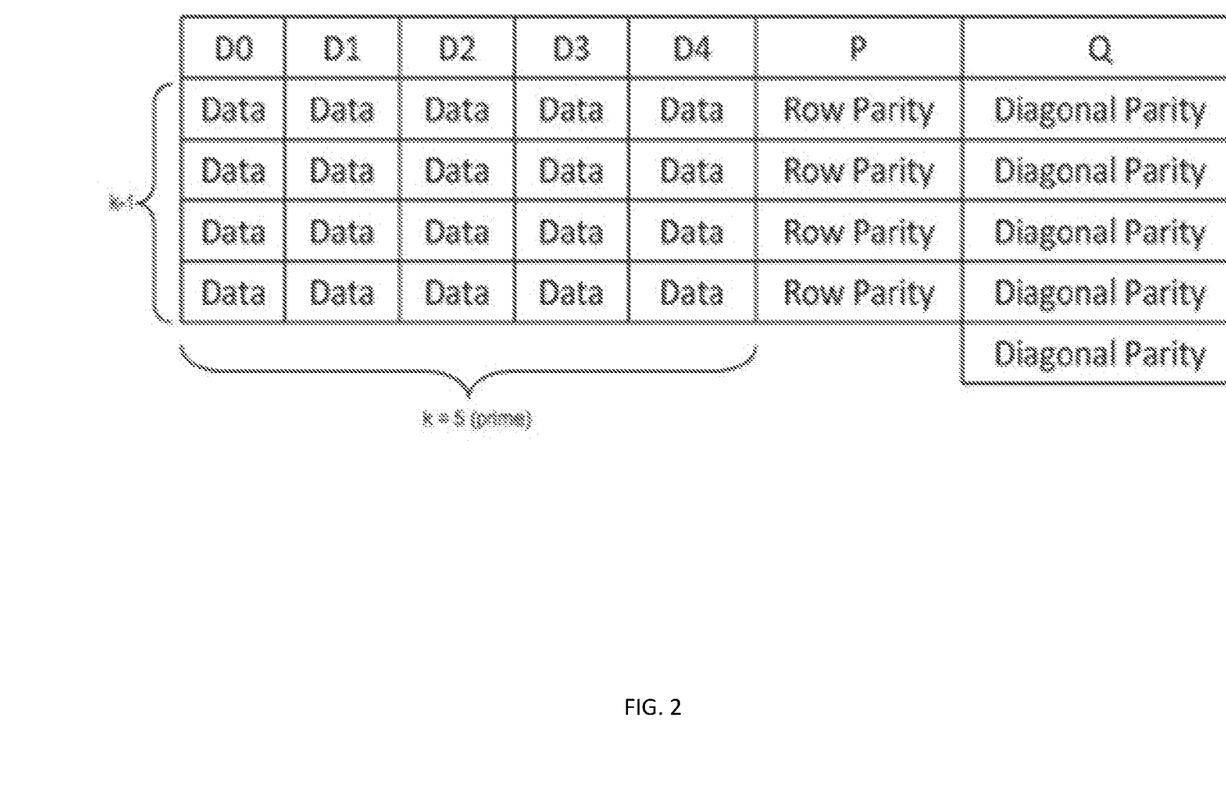
FIG. 2 is a block diagram showing a distribution of data blocks in the RAID 6 memory array of FIG. 1.

Refer to the example embodiment of FIG. 2, which is a simplified schematic diagram of the present embodiment, in the case shown, k is 5, a prime number, and there are five columns, (D0-D4). There are four rows (k−1). The P column consists of the same four rows but the Q column has an extra row.

Figure 3:
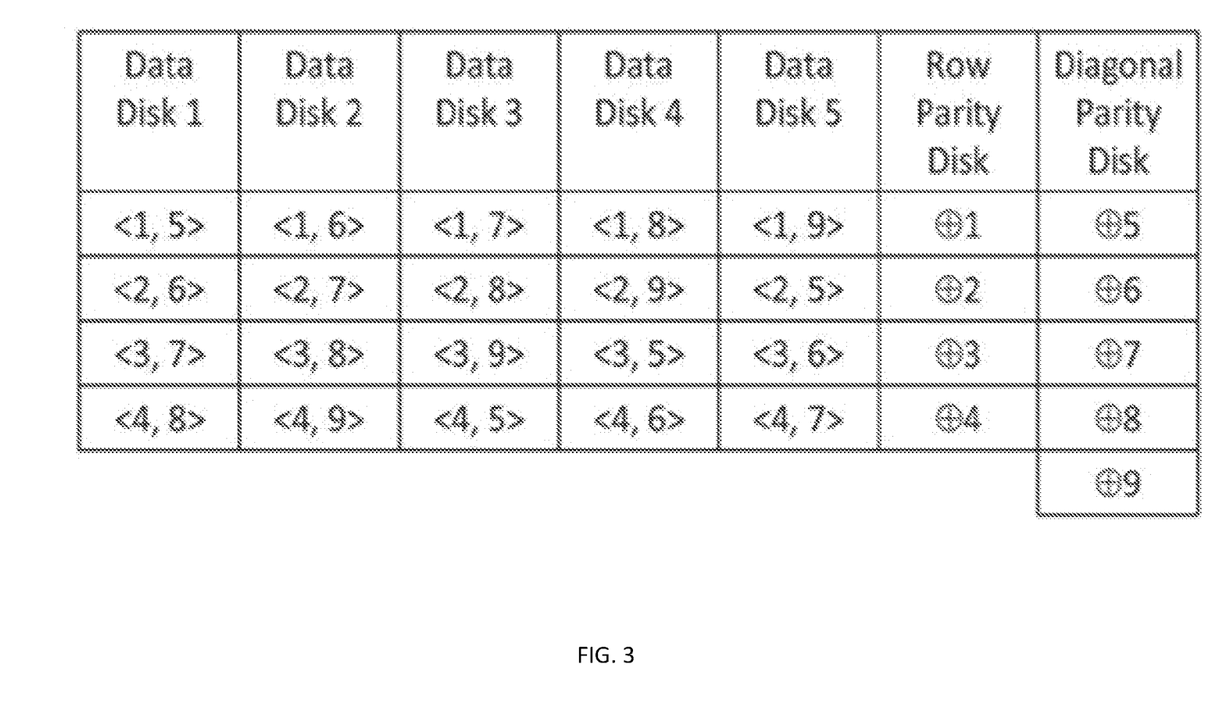
FIG. 3 is a schematic block diagram showing in greater detail the distribution of data blocks of FIG. 2.

The block size may be defined as 4K. The same scheme is shown in FIG. 3, in which the individual data blocks are defined. FIG. 3 shows which parity blocks are associated with each respective data block. For example, in this embodiment, the block showing <1, 5> may be recovered using parity disk block ⊕1 or ⊕5 XOR'd with every other data block referencing either ⊕1 or ⊕5.

The variable depth RAID scheme of the present embodiments simply adds an extra block to deal with the extra diagonal. Each stripe contains k (k must be prime) data columns, and two parity columns P and Q. The stripe is composed of a quasi-matrix of blocks, which contains k−1 rows. Column P contains K−1 blocks, each consisting of the parity of the K data disk blocks in its row. The K by K−1 matrix made up of the blocks in the data columns contains K diagonals, each of size k−1. Column Q, in contrast with the rest of the columns, contains k blocks and not k−1. Each of the k blocks in disk Q holds the parity of one of the diagonals.

It should be noted that the ordering of the blocks within each column may be arbitrary. Furthermore, the extra block in column Q may be placed in a data column which does not contain a data block in the diagonal of which this block is the parity. Some of the rows may be blank.

The resulting code is optimal under nearly all operations with respect to I/Os and computations, excluding the reads needed to rebuild a disk after one failure. The rebuild overhead after one disk failure can be brought down to a bit more than 3K/4 reads, midway between the optimal of k/2 and the k reads needed by Even/Odd and RDP. The extra block causes the capacity overhead to grow slightly, but this overhead of $1/(K^2-K)$ can be made as small as required by increasing K. Another problem this extra block may pose is that Q is larger than the rest of the columns. This is easily fixed by using a configuration where the parity columns of each stripe are balanced across the various disks. This configuration balances both I/Os and capacity utilization between the physical disks.

More information regarding RAID implementations may be found in U.S. Pat. No. 8,990,495 entitled "Secure data storage in RAID Memory Devices" which is commonly assigned herewith and incorporated by reference herein.

Updated RAID 6 Implementation

In many embodiments, the current disclosure may enable implementation of a simplified RAID 6 scheme. In various embodiments, the current disclosure may enable implementation of a RAID 6 scheme that may reduce read latency in the case of a single or a double disk failure. In certain embodiments, the current disclosure may enable recovery without requiring reading a large part of a data stripe within a RAID 6 scheme before recovering a single data block of a failed disk.

In most embodiments, the current disclosure may enable implementation of a RAID 6 scheme without an extra Q parity block. In various embodiments, the current disclosure may enable an updated RAID 6 implementation without an extra Q parity block to reduce the read penalty in the case of a double disk failure of a data disk and parity disk failure, by allowing recovery of data blocks by reading at most 2*p+1 blocks, and reduce the write overhead of parities update even on writing single block to 3 writes.

In many embodiments, the current disclosure may keep parity of each data column in the Q column such that extra data may be used during the recovery process. In various embodiments, extra stored in the Q column may replace the role of an extra Q.

In most embodiments, the following definitions may be useful. In certain embodiments, Let S be a stripe and mark $S_{i,j}:=$ "the block in row i column j". In these embodiments, for every disk j column of the stripe let $d_j:=\oplus_{i=1}^{p-1} S_{i,j}$. In these embodiments, $\forall i \in \{1 \ldots p-1\}$ define $p_i:=$ "parity of row i". In these embodiments, $q_i:=$ "parity of diagonal i" by diagonal i may refer to the diagonal that is not intersecting with column i. In these embodiments, let $q_p$ be the extra Q. In these embodiments, define $\bar{q}_k:=q_k \oplus d_k$.

In many embodiments, given P and $\bar{Q}$ a updated RAID 6 implementation may be enabled to recover from a double failure. In various embodiments, if a data disk and a Q parity disk fails, recovery in an updated RAID 6 Implementation may continue as normal.

In certain embodiments, if data disk i≠p and P disk fail, $d_1$ is known for all i≠j, and $d_i$ can be recovered from $\bar{q}_i$ since the diagonal i is not intersecting column i thus $q_i$ is known. In some embodiments, XOR'ing out the $d_j$ from $\bar{Q}$ bring us to the known recovery formula. In certain embodiments, if i=p then Q is known since all $d_j$ are, and each block may be recovered from diagonal.

In most embodiments, if two data disks fail (disk i and disk j) where neither failed disk is the parity disk P, an updated RAID 6 implementation may be enabled to recover the blocks using two steps. In various embodiments, a first step may include partially recovering each block.

$$\hat{S}_{k,i} = S_{k,i} \oplus \{\text{either } d_i \text{ or } d_j\}$$

$$\hat{S}_{k,j} = S_{k,j} \oplus \{\text{either } d_i \text{ or } d_j\}$$

In certain embodiments, a second step may include XOR out $d_i$ and $d_i$ to get the data block $S_k$, and $S_{k,j}$. In various embodiments, since p−1 is even, r and p−1−r are even\odd together, if r is even than XOR on all blocks of the column i will eliminate $d_j$ and $d_i$ and thus we will get $d_i$ and in the same way we can get $d_j$, and thus recover the data. In certain embodiments, if r is odd, than we get $\oplus_{i=1}^{r} S_{k,j} \oplus_{i=r+1}^{p-1-r} S_{k,j} \oplus d_j \oplus d_i = d_i$ thus we get $d_i$ and $d_j$ and we may continue recovery. In some embodiments, the case of i=p is just a special case with r=0.

In most embodiments, an updated RAID 6 implementation may provide advantages. In various embodiments, a parity disk failure may cause, at most, reading 2*P+1 blocks for double-degraded read. In certain embodiments, upon write of single block at most 3 parities may be updated (row parity, diagonal parity, and the diagonal XOR'd with the column parity).

Figure 4:
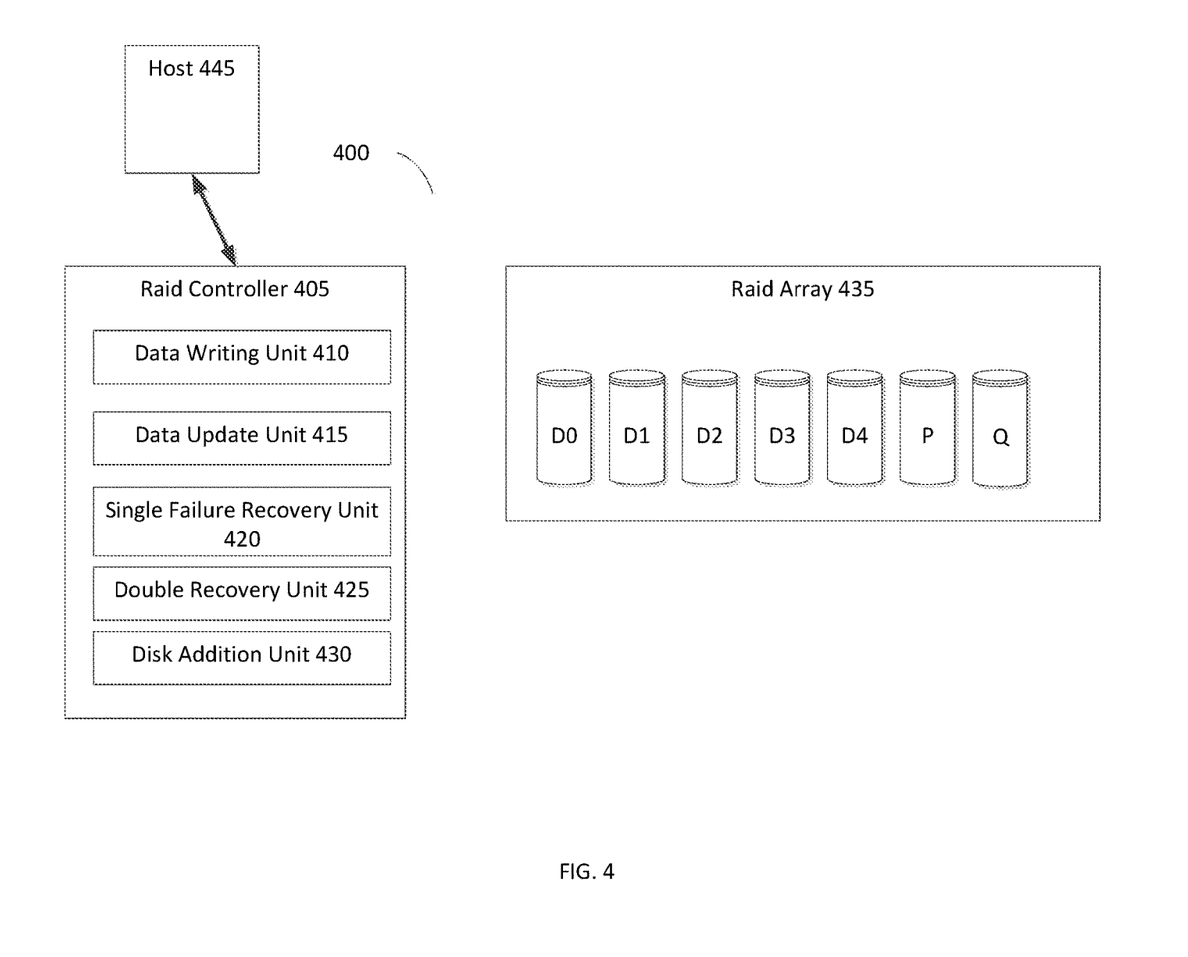
FIG. 4 is a simplified illustration of a Redundant Array of Independent Disks (RAID) 6 implementation on a Raid system, in accordance to an embodiment of the present disclosure.

Refer to the example embodiment of FIG. 4. FIG. 4 is a simplified illustration of a Redundant Array of Independent Disks (RAID) 6 implementation on a Raid system, in accordance to an embodiment of the present disclosure. As shown, Raid system 400 includes raid controller 405 and raid array 435. Raid array 435 includes data disks D0, D1, D2, D3, D4, D5, parity disk P, and parity disk Q. As shown, each of the data storage disks on Raid array 435 are the same size.

Raid controller 405 includes data writing unit 410, data update unit 415, single failure recovery unit 420, double recovery unit 425, and disk addition unit 430. Data writing unit 410 is enabled to handle initial data writes to raid array 435. Data update unit 415 is enabled to handle updates to data already stored on raid array 435. Single failure recovery unit 420 is enabled to handle recovery of a failure of a single disk within raid array 435. double recovery unit 425 is enabled to handle failure of two disks within array 435. Disk addition unit 430 is enabled to handle either replacement of a failed disk within RAID array 435 or addition or more disks within raid array 435 to increase the storage size of raid system 400.

Figure 5A:
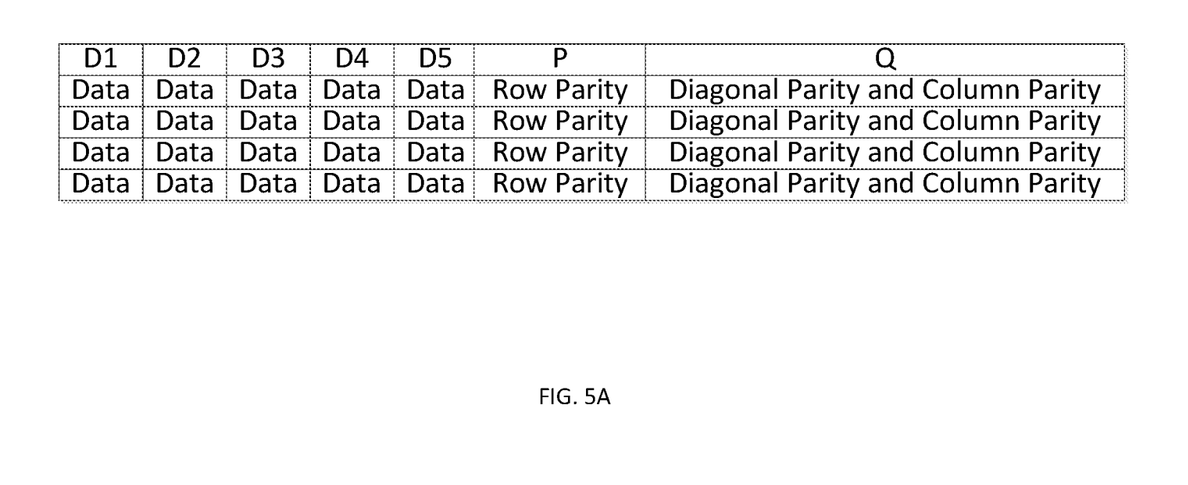
FIGS. 5A and 5B are simplified illustrations of a striping pattern of a Redundant Array of Independent Disk (RAID) implementation, in accordance with an embodiment of the present disclosure.
Figure 5B:
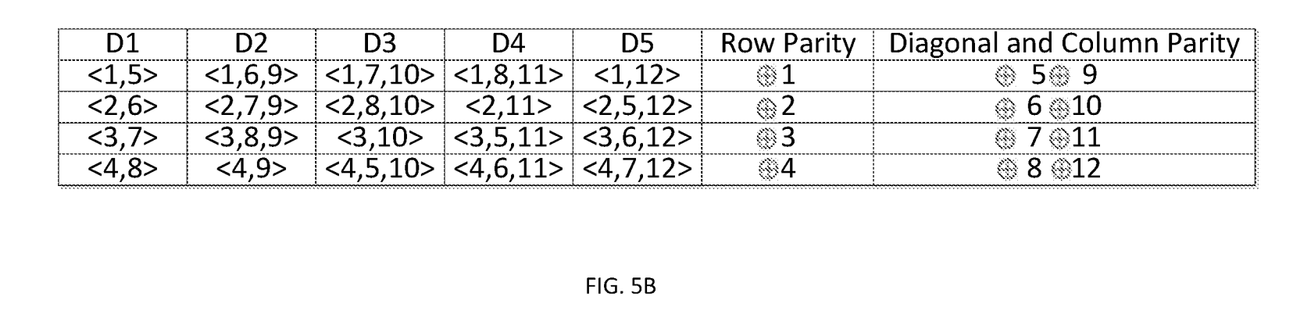

Refer to the example embodiments of FIGS. 5A and 5B. FIGS. 5A and 5B are simplified illustrations of a striping pattern of a Redundant Array of Independent Disk (RAID) implementation, in accordance to an embodiment of the present disclosure. As shown in FIG. 5A, data is striped across data storage disks D1-D5 using five columns and four rows of data. Parity disk P is enabled to store parity data for each respective row. Parity disk Q is enabled to store a combination of diagonal parity data and column parity data.

As shown in FIG. 5B, each of the data blocks within data storage disks D1-D5 show which parity blocks are associated with each data block. For example, data block (row 1, column 1) shows "<1,5>" which indicates that parity blocks "⊕1" and "⊕5" may be used to recover data within that data block. In this embodiment, each row parity data block is associated with data blocks in each respective row within data storage disks D1-D5. Diagonal and column parity disk includes diagonal parity data and column parity data XOR'd together.

Figure 6:
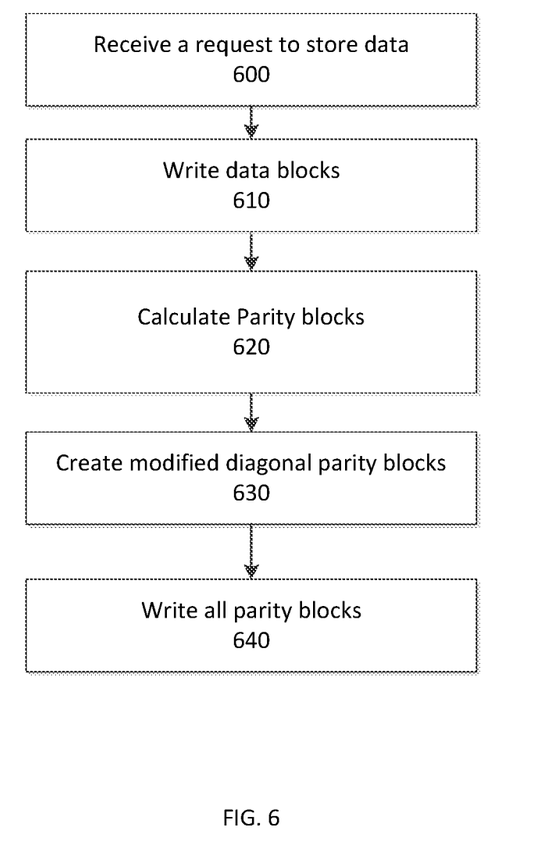
FIG. 6 is a simplified flowchart of a method of storing data within a RAID system as shown in FIG. 4, in accordance with an embodiment of the present disclosure.

Refer to the example embodiment of FIGS. 4 and 6. FIG. 6 is a simplified flowchart of a method of storing data within a RAID system as shown in FIG. 4, in accordance with an embodiment of the present disclosure. FIG. 4 shows Raid System 400 which includes raid controller 405 and raid array 435. raid controller 405 manages data received from host 445 and stores the data on raid 435 using data writing unit 410, data update unit 415, single failure recovery unit 420, double recovery unit 425, and disk addition unit 430.

In this embodiment, raid system 400 receives a request to store data from host 445 (Step 600). raid controller 405 utilizes data writing unit 410 to write data blocks to disks D0-D4 of raid array 435 (Step 610). Data writing unit 410 calculates parity blocks to be stored on parity disk P and parity disk Q (Step 620), which includes creating row parity blocks, diagonal parity blocks, and column parity blocks. Data writing unit 410 creates modified diagonal parity blocks (Step 630) by combining diagonal parity blocks and column parity blocks. Disk writing unit 410 then writes the row parity blocks to parity disk P and the combined diagonal column parity blocks to parity disk Q (Step 640).

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 7:
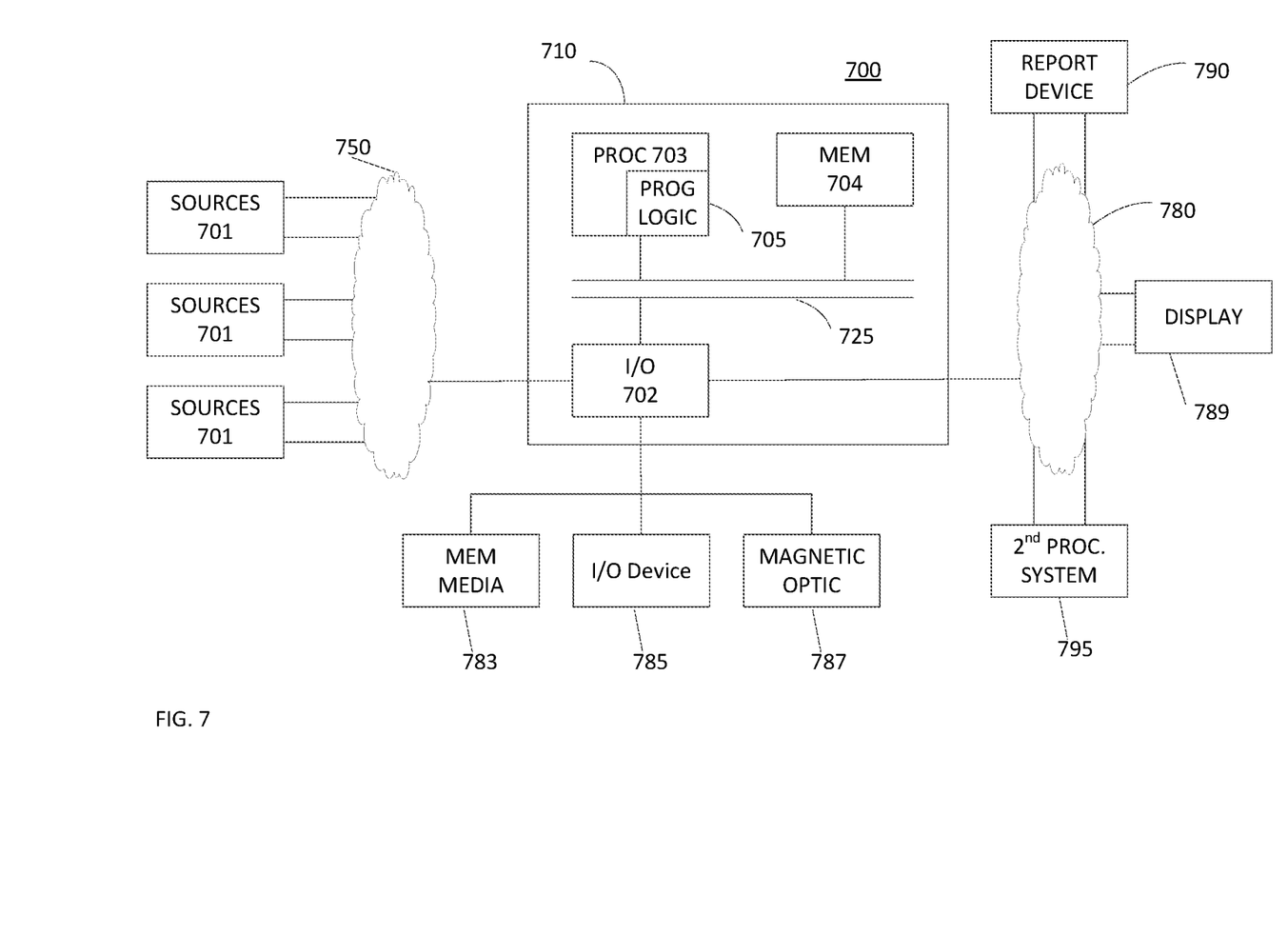
FIG. 7 is an example of an embodiment of an apparatus that may utilize the techniques described herein, in accordance with an embodiment of the present disclosure.

FIG. 7 is a block diagram illustrating an apparatus, such as a computer 710 in a network 700, which may utilize the techniques described herein according to an example embodiment of the present invention. The computer 710 may include one or more I/O ports 702, a processor 703, and memory 704, all of which may be connected by an interconnect 725, such as a bus. Processor 703 may include program logic 705. The I/O port 702 may provide connectivity to memory media 783, I/O devices 785, and drives 787, such as magnetic drives, optical drives, or Solid State Drives (SSD). When the program code is loaded into memory 704 and executed by the computer 710, the machine becomes an apparatus for practicing the invention. When implemented on one or more general-purpose processors 703, the program code combines with such a processor to provide a unique apparatus that operates analogously to specific logic circuits. As such, a general purpose digital machine can be transformed into a special purpose digital machine.

Figure 8:
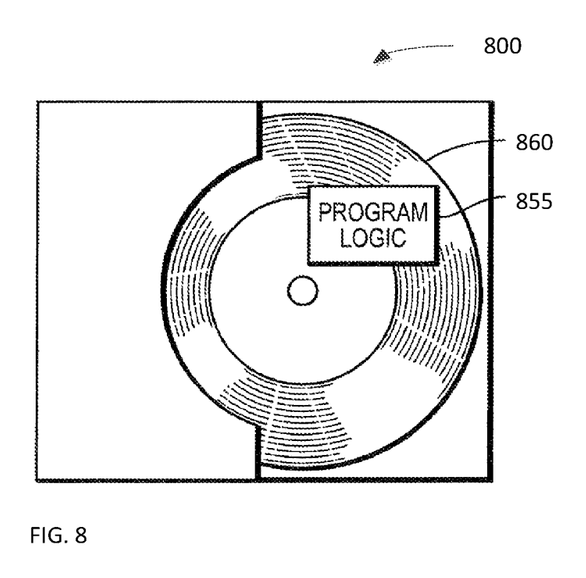
FIG. 8 is an example of a method embodied on a computer readable storage medium that may utilize the techniques described herein, in accordance with an embodiment of the present disclosure.

FIG. 8 is a block diagram illustrating a method embodied on a computer readable storage medium 860 that may utilize the techniques described herein according to an example embodiment of the present invention. FIG. 8 shows Program Logic 855 embodied on a computer-readable medium 860 as shown, and wherein the Logic is encoded in computer-executable code configured for carrying out the methods of this invention and thereby forming a Computer Program Product 800. Program Logic 855 may be the same logic 705 on memory 704 loaded on processor 703 in FIG. 7. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of implementing a redundant array of independent disk (RAID) system wherein the RAID, the computer-executable method comprises:
   storing data storage blocks arranged in a first plurality of data rows and a second plurality of data columns; and
   storing parity data in defined parity blocks, wherein a portion of the defined parity blocks include column parity data;
   wherein each, column parity data is combined with a row of diagonal parity data wherein the row of diagonal parity data is not associated with the column parity data.

2. The computer-executable method of claim 1, wherein at least some of said parity data is row parity data placed in row parity blocks in a row parity column.

3. The computer-executable method of claim 1, wherein at least some of said parity data is diagonal parity data placed in diagonal parity blocks in a diagonal parity column.

4. The computer-executable method of claim 3, wherein the diagonal parity data is combined with column parity data.

5. The computer-executable method of claim 3, wherein the number of data rows equals a number of rows of the row parity data and the number of rows of diagonal parity data.

6. A system, comprising:
   a data storage system implementing a Redundant Array of Independent Disks (RAID); and
   computer-executable program logic encoded in memory of one or more computers enabled to implement RAID 6 on the data storage system, wherein the computer-executable program logic is configured for the execution of:

storing data storage blocks arranged in a first plurality of data rows and a second plurality of data columns; and storing parity data in defined parity blocks, wherein a portion of the defined parity blocks include column parity data;

wherein each column parity data is combined with a row of diagonal parity data wherein the row of diagonal parity data is not associated with the column parity data.

7. The system of claim 6, wherein at least some of said parity data is row parity data placed in row parity blocks in a row parity column.

8. The system of claim 6, wherein at least some of said parity data is diagonal parity data placed in diagonal parity blocks in a diagonal parity column.

9. The system of claim 8, wherein the diagonal parity data is combined with column parity data.

10. The system of claim 8, wherein the number of data rows equals a number of rows of the row parity data and the number of rows of diagonal parity data.

11. A computer program product for implementing a Redundant array of independent disk (RAID) system, the computer program product comprising:

a non-transitory computer readable medium encoded with computer-executable code, the code configured to enable the execution of:

storing data storage blocks arranged in a first plurality of data rows and a second plurality of data columns; and storing parity data in defined parity blocks, wherein a portion of the defined parity blocks include column parity data;

wherein each column parity data is combined with a row of diagonal parity data wherein the row of diagonal parity data is not associated with the column parity data.

12. The computer program product of claim 11, wherein at least some of said parity data is row parity data placed in row parity blocks in a row parity column.

13. The computer program product of claim 11, wherein at least some of said parity data is diagonal parity data placed in diagonal parity blocks in a diagonal parity column.

14. The computer program product of claim 13, wherein the diagonal parity data is combined with column parity data.

15. The computer program product of claim 13, wherein the number of data rows equals a number of rows of the row parity data and the number of rows of diagonal parity data.

* * * * *